JOSEPH F. GLIDDEN.

Improvement in Land-Roller.

No. 127,687.  Patented June 11, 1872.

Scale of 2 feet.

Witnesses
Amos Ward
Orin Smith

Inventor
Joseph F. Glidden
By G. L. Chapin
atty

ന്ന്127,687

UNITED STATES PATENT OFFICE.

JOSEPH F. GLIDDEN, OF DE KALB, ILLINOIS.

IMPROVEMENT IN LAND-ROLLERS.

Specification forming part of Letters Patent No. 127,687, dated June 11, 1872.

SPECIFICATION.

I, JOSEPH F. GLIDDEN, of De Kalb, in the county of De Kalb and State of Illinois, have invented an Improved Land-Roller, of which the following is a specification:

The present invention relates to an improved roller for leveling the surface of land; and its nature consists, first, in the novel construction of the roller; second, in combining the rollers with the forward gearing of a farm-wagon and with a long rear axle-tree, whereby the rollers may come in contact with the surface of uneven soil and be turned around conveniently, their distance apart being such that the two side rollers will cover and roll the surface between the rollers at either side of the wagon or the space left between the rollers, as the whole is hereinafter fully described and shown.

Figure 2:
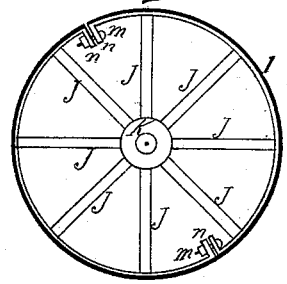
Figure 3:
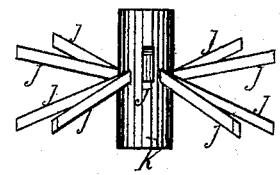
Figure 1:
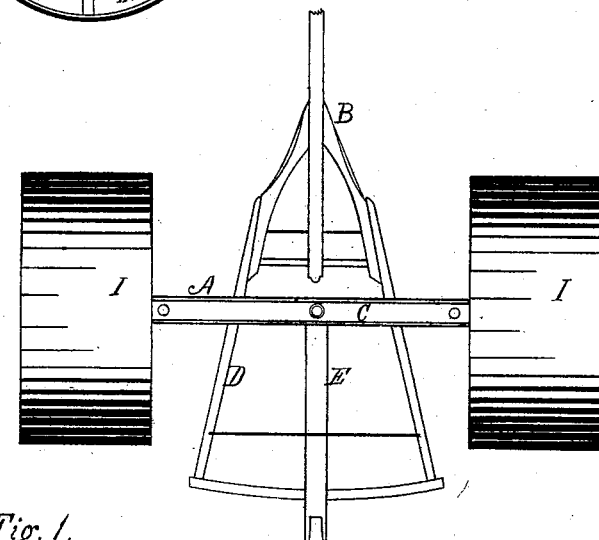
Figure 1:
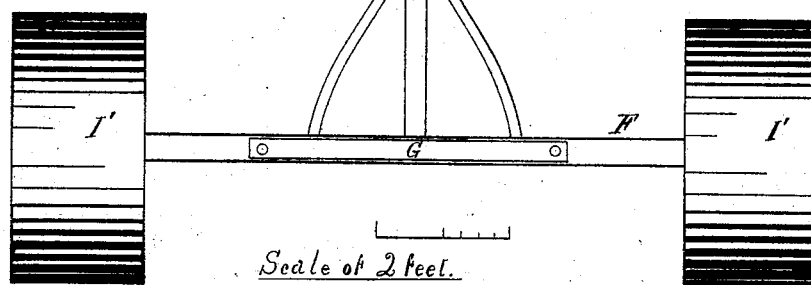

In the drawing, Figure 1 is a plan or top view of my improved roller; Fig. 2, an elevation of one of the rollers when made of iron; Fig. 3, a top view of the hub and spokes of one of the rollers with the periphery of the roller removed to give a clear view of the construction.

A represents the forward axle, B the tongue, E the reach, and D the hound of an ordinary farm-wagon, C being the bolster which supports the box. I remove the rear axle-tree of the wagon and substitute a reach of such length as will place the rear rollers I' nearly their length further out than the forward rollers I, so that as large a surface as possible may be rolled by passing over the ground once, the rollers I I' on either side rolling the space between the rollers I I the second time. The rollers, when made of iron, are as follows: The periphery is made of two pieces, and provided with inwardly-projecting flanges $n\ n$ for the purpose of receiving the bolts $m$, which clamp the rim to the spokes. These spokes, as shown at J J, &c., are not tenoned into the rim of the roller, as is customary in constructing wagon-wheels; but they are made very strong, and set in the hub $k$ alternately inclined in opposite directions, as shown in Fig. 3, and the rim I is clamped onto their outer ends tightly enough to form a strong wheel or roller, experiments proving that the rim will, when secured in this way, remain firm for an indefinite time, while, at the same time, the roller is made at comparatively small cost.

If wood rollers are used, and are found too light, the wagon can be loaded with stone or some other convenient weight.

When the wagon is to be used the forward rollers I I and long rear axle-tree F are removed, so that the wagon axle-tree can be coupled on as before the same was removed.

In my invention I do not claim rear rollers working behind a forward roller or rollers for following the surface of uneven ground, for such rollers have been shown in patent to G. H. Dow, November 14, 1871, and to John Cole, November 21, 1871; but my invention differs from either of these patents, inasmuch as it is provided with two forward rollers rotating on the forward axle-tree of a wagon instead of one roller operating in a frame made especially for it.

Having thus described my invention, what I claim, and desire to secure by Letters Patent, is—

1. The roller, consisting of one or more rim pieces, provided with flanges $n$ and clamped to the spokes J J, which are inclined in opposite directions to give a broad bearing and support to the rim when the latter is held by friction, as set forth.

2. The combination of the two forward rollers, placed on the forward axle-tree of a wagon, and combined with a long rear axle-tree, F, and rear rollers, as and for the purpose set forth.

JOSEPH F. GLIDDEN.

Witnesses:
 G. L. CHAPIN,
 W. C. BRUSON.